US010225197B2

(12) United States Patent
Jarvis et al.

(10) Patent No.: US 10,225,197 B2
(45) Date of Patent: Mar. 5, 2019

(54) STORAGE CONTROLLER QUALITY OF SERVICE MANAGEMENT TECHNIQUES

(71) Applicant: INTERNATIONAL BUSINESS MACHINES CORPORATION, Armonk, NY (US)

(72) Inventors: Matthew J. Jarvis, Sheffield (GB); Geraint North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 14/734,625

(22) Filed: Jun. 9, 2015

(65) Prior Publication Data

US 2015/0271082 A1 Sep. 24, 2015

Related U.S. Application Data

(63) Continuation of application No. 14/515,106, filed on Oct. 15, 2014.

(51) Int. Cl.
*G06F 15/173* (2006.01)
*H04L 12/825* (2013.01)
*H04L 29/08* (2006.01)
*G06F 9/54* (2006.01)

(52) U.S. Cl.
CPC ................ *H04L 47/25* (2013.01); *G06F 9/54* (2013.01); *H04L 67/1097* (2013.01); *H04L 67/322* (2013.01)

(58) Field of Classification Search
USPC ......................... 709/223, 224, 228, 232, 233
See application file for complete search history.

(56) References Cited

U.S. PATENT DOCUMENTS 7,640,231 B2 12/2009 Alvarez et al.
7,660,264 B1 * 2/2010 Eiriksson ............ H04L 12/4633 370/254
7,917,903 B2 3/2011 Lumb et al.
8,346,917 B2 1/2013 Balasubramanian et al.
8,521,891 B1 * 8/2013 Shinde ............. G06F 17/30902 709/206
2003/0135639 A1 * 7/2003 Marejka ................. H04L 47/10 709/232

(Continued)

FOREIGN PATENT DOCUMENTS

WO 2008079955 A2 7/2008

OTHER PUBLICATIONS

IP.COM,"System and method for applications to signal performance data to storage controllers", Prior Art Database Disclosure, IP.com Disclosure No. IPCOM000220088D, Publication Date: Jul. 20, 2012 URL: http://ip.com/IPCOM/000220088.

(Continued)

*Primary Examiner* — Liang Che A Wang
(74) *Attorney, Agent, or Firm* — Brian F. Russell; Jason Sosa

(57) ABSTRACT

A technique for managing a data network includes monitoring data transfer rates and data transfer thresholds for data transferred between storage and an application. Feedback on the suitability of the data transfer rate is collected from the application. A data transfer threshold for the application is changed based on the monitored data transfer rate and the collected feedback.

3 Claims, 8 Drawing Sheets

| QOS Guarantee | Disk1 2500 | Disk2 2500 | Disk3 2500 | Disk4 2500 | Unallocated 5000 |
|---|---|---|---|---|---|

App1 App2 App3 App4

| QoS Guarantee (QoSG) | Disk1 2500 | Disk2 2500 | Disk3 2500 | Disk4 2500 | Unallocated 5000 |
|---|---|---|---|---|---|
| Actual | 2000 <QoSG | 2500 =QoSG | 4000 =QoSG | 3000 >QoSG | |

Previously used

| QoS Guarantee (QoSG) | Disk1 2500 | Disk2 2500 | Disk3 2500 | Disk4 2500 | Disk5 2500 | Disk6 2500 |
|---|---|---|---|---|---|---|
| Actual | 2000 | 2500 | 2750 | 2750 | 2500 | 2500 |
| | Unthrottled | | Throttled | | Unthrottled | |

(56) References Cited

U.S. PATENT DOCUMENTS

| | | | | |
|---|---|---|---|---|
| 2006/0164979 | A1* | 7/2006 | Pirbhai | H04L 43/02 370/229 |
| 2009/0322510 | A1* | 12/2009 | Berger | G06Q 10/08 340/539.1 |
| 2010/0106820 | A1 | 4/2010 | Gulati et al. | |
| 2010/0287137 | A1* | 11/2010 | Lyakhovitskiy | G06F 17/30067 707/609 |
| 2012/0054329 | A1 | 3/2012 | Gulati et al. | |
| 2015/0134809 | A1* | 5/2015 | Tofighbakhsh | H04L 69/321 709/224 |

OTHER PUBLICATIONS

Magoutis et al., “OASIS: self-tuning storage for applications.” Fourteenth NAASA Goddard, Twenty-Third IEEE Conference on Mass Storage Systems and Technologies, College Park, Maryland, USA. 2006.

* cited by examiner

| QoS Guarantee (QoSG) | Disk1 2500 | Disk2 2500 | Disk3 2500 | Disk4 2500 | Unallocated 5000 |
|---|---|---|---|---|---|
| Actual | 2000 <QoSG | 2500 =QoSG | 4000 =QoSG | 3000 >QoSG | |

Previously used

| QoS Guarantee (QoSG) | Disk1 2500 | Disk2 2500 | Disk3 2500 | Disk4 2500 | Disk5 2500 | Disk6 2500 |
|---|---|---|---|---|---|---|
| Actual | 2000 | 2500 | 2750 | 2750 | 2500 | 2500 |
| | Unthrottled | | Throttled | | Unthrottled | |

| | | | | | |
|---|---|---|---|---|---|
| QoS Guarantee (QoSG) | Disk1 2500 | Disk2 2500 | Disk3 4000 | Disk4 3000 | Unallocated 3500 |
| Actual | 2500 =QoSG | 2500 =QoSG | 4000 =QoSG | 3000 =QoSG | |

| QoS Guarantee (QoSG) | Disk1 2500 | Disk2 2500 | Disk3 2500 | Disk4 2500 | Disk5 2500 | Disk6 2500 |
|---|---|---|---|---|---|---|

FIGURE 5A

| QoSG | Disk1 2500 | Disk2 2500 | Disk3 2500 | Disk4 2500 | Disk5 2500 | Disk6 2500 | Spare Capacity |
|---|---|---|---|---|---|---|---|
| Actual | 2000 <QoSG | 2000 <QoSG | 2000 <QoSG | 2000 <QoSG | 2000 <QoSG | 2000 <QoSG | |

FIGURE 5B

| QoSG | Disk1 2000 | Disk2 2000 | Disk3 2000 | Disk4 2500 | Disk5 2000 | Disk6 2000 | Spare Capacity 5000 |
|---|---|---|---|---|---|---|---|
| Actual | 2000 =QoSG | 2000 =QoSG | 2000 =QoSG | 2000 =QoSG | 2000 =QoSG | 2000 =QoSG | |

STORAGE CONTROLLER QUALITY OF SERVICE MANAGEMENT TECHNIQUES

This application is a continuation of U.S. patent application Ser. No. 14/515,106, entitled "TECHNIQUES FOR STORAGE CONTROLLER QUALITY OF SERVICE MANAGEMENT," filed Oct. 15, 2014, which claims priority to United Kingdom Patent Application 1318218.3, entitled "STORAGE CONTROLLER QUALITY OF SERVICE," filed Oct. 15, 2013. The disclosure of U.S. patent application Ser. No. 14/515,106 is hereby incorporated herein by reference in its entirety for all purposes.

BACKGROUND

This application is generally directed to quality of service management and, more particularly, to techniques for storage controller quality of service management.

In enterprise computing environments, there are often two completely different sets of performance metrics in operation between an external storage controller and application. At the storage controller level, performance can only be automatically measured in terms of input and output (IO) operations per second. However, at the application level users and administrators are concerned with a different but related set of metrics. For example, a database application may be concerned about database reads and writes per second.

These two different views on performance make managing the relationship between storage performance and application performance difficult and often utilize different sets of skills and people to measure performance. This inevitably leads to generalized performance requirements at the storage level. As such, setting a level of storage performance is always a compromise. In addition, some quality of service (QoS) implementations rely on the concept of providing performance to whatever level an object involved requires, at the expense of other objects. In these types of QoS implementations, an application under heavy load may negatively impact performance of other storage subsystem users.

BRIEF SUMMARY

Disclosed are a method, a network controller, and a computer program product (embodied in a computer-readable storage device) for storage controller quality of service management.

A technique for managing a data network includes monitoring data transfer rates and data transfer thresholds for data transferred between storage and an application. Feedback on the suitability of the data transfer rate is collected from the application. A data transfer threshold for the application is changed based on the monitored data transfer rate and the collected feedback.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIGS. 5A to 5D show a further example set of applications requesting a minimum quality of service.

DETAILED DESCRIPTION

Figure 1A:
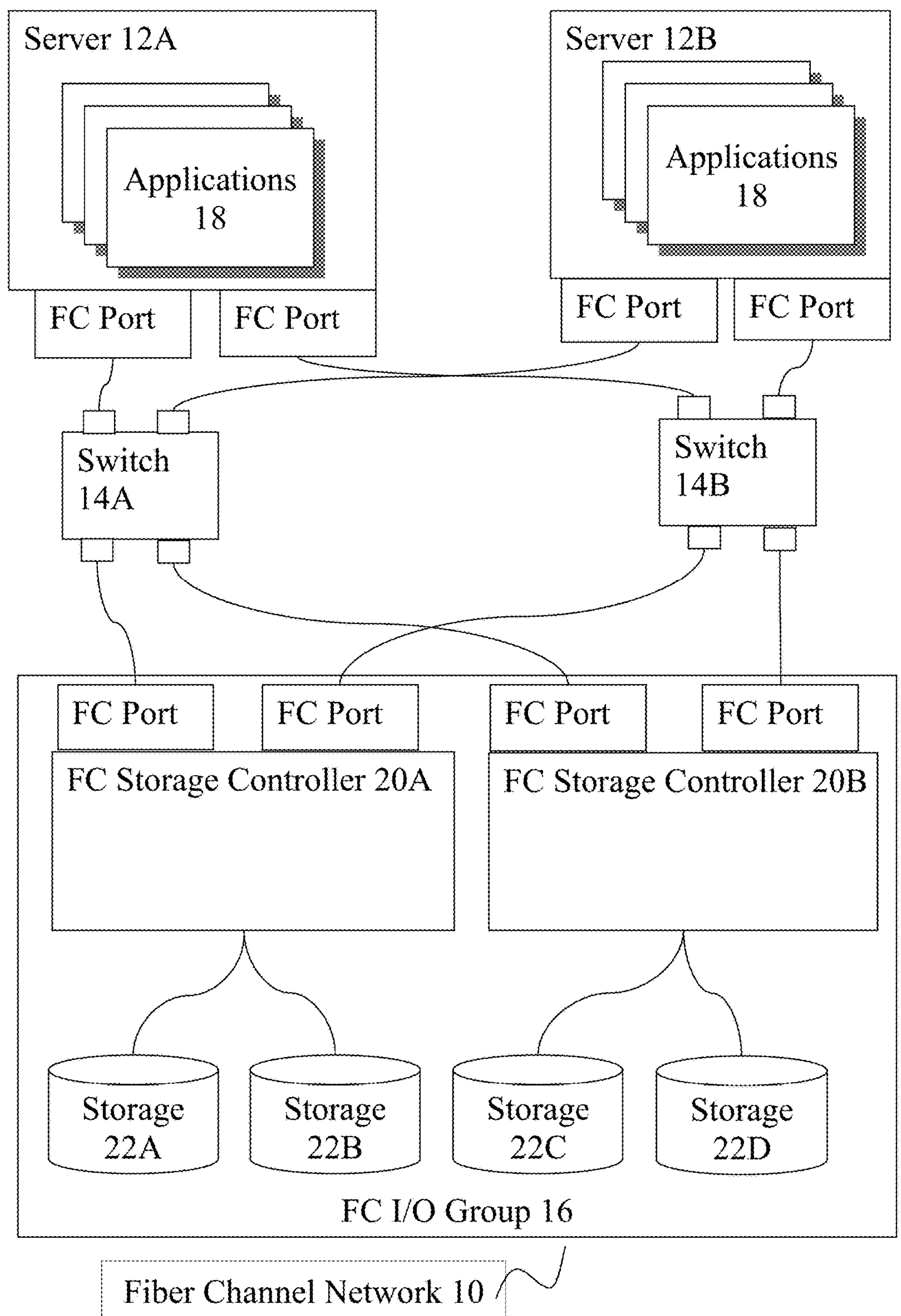
FIG. 1A is component diagram of an exemplary Fibre Channel (FC) environment.

The illustrative embodiments provide a method, network controller, and a computer program product (embodied in a computer-readable storage device) for storage controller quality of service management.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

In a first aspect of the present disclosure, a network controller includes: a monitor for monitoring data transfer rates and data transfer thresholds for transferring data between storage and one or more applications; a feedback collector for collecting feedback on the suitability of the transfer data rate from one or more of the applications; and a threshold adjuster for changing data transfer thresholds for at least one application based on the monitored data transfer rate and the collected feedback. In a second aspect of the present disclosure, a method of managing a data network includes: monitoring data transfer rates and data transfer thresholds for transferring data between storage and one or more applications; collecting feedback on the suitability of the transfer data rate from one or more of the applications; and changing the data transfer threshold levels for at least one application based on the monitored data transfer rate and the collected feedback.

The various disclosed embodiments allow applications to request current performance levels, as a quality of service (QoS) requirement. directly from a storage controller. This allows the storage controller to set its quality of service efforts based on incoming data from an application. This facilitates both easier systems management and more accurate setting of performance requirement information for QoS purposes. In addition, in the types of QoS implementations defined above, having a defined metric for a maximum performance level required allows the QoS implementation to cap resource usage for a particular application at the levels identified by the application, which generally prevents resource starvation for other volumes without QOS requirements.

The data transfer thresholds may take the form of data transfer thresholds in a storage controller. Alternatively, data transfer thresholds may take the form of data transfer thresholds in a network switch. A minimum data transfer rate may be set as the monitored data transfer rate for an application, if the application declares that a required performance level has been reached. Feedback may, for example, take the form of an application programming interface (API) message that declares that a required performance level has been reached. In one or more embodiments, an application has an application programming interface (API) that is configured to send data directly to a storage controller declaring that a required performance level has been reached. Based on this data, the storage controller can check the performance levels for the volumes involved and set this as a minimum resource guarantee level for quality of service policy purposes.

Advantageously, the method may further comprise requesting feedback from one or more applications. It is envisioned that applications may send feedback to a storage controller independently of the storage controller for independent operation. However, it may be advantageous for the storage controller to request feedback from all applications at a single point in time in some situations. Communication between an application and a storage controller may be performed using the same channels that are used for data transfer. For example, high-speed Fibre Channel (FC) storage used for high-speed data transfer can be used.

Communication between an application and a storage controller may be out-of-band with storage traffic, e.g., via a separate network. For example, applications can use an Internet protocol network to communicate with a storage controller. The storage may not be directly attached to servers executing the applications. For example, cloud based storage or infrastructure as a service (IAAS) storage may be employed. The various embodiments allow applications to request current performance levels, as a quality of service (QoS) requirement, directly from a storage controller, allowing the storage controller to set quality of service efforts based on the incoming data from an application. This provides both easier systems management and more accurate setting of performance requirement information for QoS purposes.

In addition, in the types of QoS implementation defined above, having a defined metric for maximum performance level required allows the QoS implementation to cap resource usage for a particular application at the levels identified by the application, preventing resource starvation for other volumes without QoS requirements. Communication between an application and storage controller may be in-band over FC, or via Internet protocol (IP) based side channels. If the communication is achieved using in-band FC packets, this can also be communicated to storage area network (SAN) fabric infrastructure, allowing for switches to also use the information to control SAN bandwidth and performance levels.

The various embodiments are particularly appropriate for situations where storage may be provided as a third party offering to an application provider, as in a cloud or IAAS offering, as it provides a method where performance requirements can be communicated automatically to external providers. The embodiments have a performance guaranteeing effect on processes carried on in applications that use storage arrays controlled by a storage controller. The various embodiments may operate at a computer system level and below an overlying application level. The embodiments facilitate implementation of a storage controller that operates in a novel manner leading to an increase in speed and/or reliability of the storage controller and applications that use controlled storage.

According to a third aspect, a computer program product for managing a storage controller is disclosed. The computer program product comprises a computer-readable storage medium having computer-readable program code embodied thereon. The computer-readable program code is configured to perform the above-described method. According to a fourth aspect, a computer program stored on a computer-readable medium and loadable into an internal memory of a digital computer (data processing system), comprising software code portions, when the program is executed on a computer, that performs the above-described method. According to a fifth aspect, a data carrier that comprises functional computer data structures to, when loaded into a computer system and operated upon thereby, enable the computer system to perform the above-described method. A suitable data-carrier includes, for example, a solid-state memory, a magnetic drive, or an optical disk. Channels for the transmission of data may likewise comprise storage media of all descriptions.

Various embodiments of the present disclosure are directed to enabling applications to signal maximum performance to storage controllers, which allows for easier system management and capping of resource requirements for quality of service. Referring to FIG. 1A, a known high-speed FC data network in which the embodiment can be deployed is shown. FC network 10 comprises: servers 12A and 12B; switches 14A and 14B; and FC Input/Output (I/O) Group 16.

The FC network 10 facilitates a high-speed data transfer between servers 12A and 12B and FC I/O group 16, via switches 14A and 14B. In one embodiment, the high-speed data network is FC but other high-speed data networks are envisioned. Servers 12A and 12B are computer systems that execute applications 18 and use high-speed data from FC I/O group 16. Servers 12A and 12B connect to other components of the FC system using FC ports. In the disclosed embodiment there are two servers and each server has dual FC ports. While the disclosed embodiment has dual FC ports (dual node), other embodiments may have a single port. Servers 12A and 12B further comprise alternative ports for a wide area network (WAN) connection to more generic network devices (not shown).

Switches 14A/14B comprise two or more fast data connections and enable high-speed data to move along the fastest data connection. A switch in the context of this disclosure may be a simple switch or a complex structure of switches (also known as a fabric). In an embodiment, each switch has four FC ports. An embodiment is contemplated in which the switch plays a pivotal role in implementing the disclosed techniques. Another embodiment is contemplated in which a switch is not employed. FC I/O group 16 enables high-speed data to flow into and out of disk storage using four FC ports.

FC I/O group 16 comprises: FC storage controller 20A/20B and physical disk storage 22A, 22B, 22C and 22D. FC storage controllers 20A and 20B enable the data to be written and read from physical disk storage 22A, 22B, 22C and 22D. FC storage controller 20A is described in more detail with respect to FIG. 1B. The purpose of the storage controllers is to take physical disks and make them available to applications as 'virtual disks'. The data on those virtual disks may actually be striped across a number of different physical disks or mirrored without the application being aware of those aspects. Physical storage disks 22A, 22B, 22C and 22D may be standard disks. FC storage controller 20A and 20B can configure any number of virtual storage partitions on the physical disks.

Figure 1B:
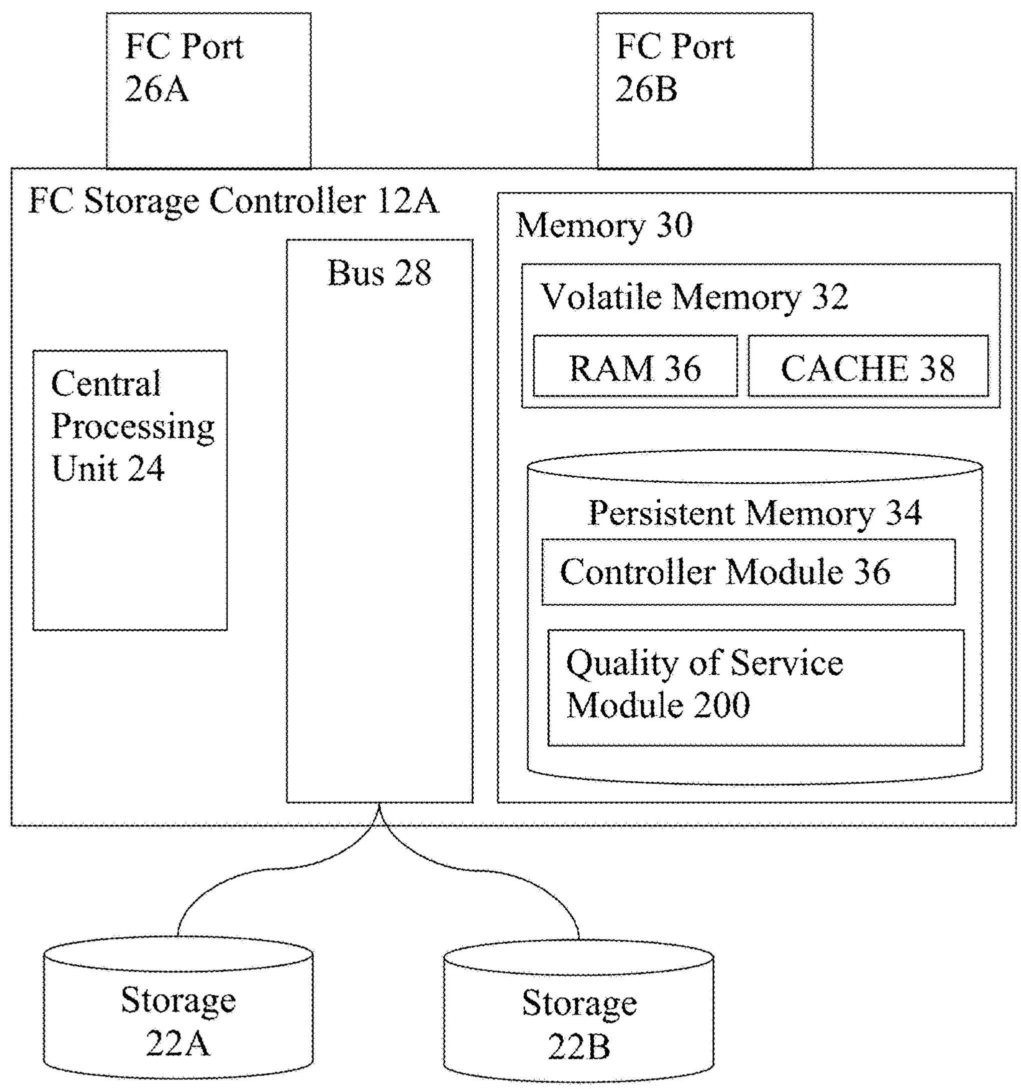
FIG. 1B is a deployment diagram of an embodiment within an FC storage controller.

Referring to FIG. 1B, the deployment of an exemplary FC storage controller 12A is described. A similar deployment in FC storage controller 12B is contemplated in another embodiment with modifications to enable operation of storage controller 12A with numerous other general purpose or special purpose computing system environments or configurations. Examples of well-known computing processing systems, environments, and/or configurations that may be suitable for use with storage system 10 include, but are not limited to, dedicated controller systems, server computer systems, thin clients, thick clients, hand-held or laptop devices, multiprocessor systems, microprocessor-based systems, network PCs, minicomputer systems, mainframe computer systems, and distributed cloud computing environments that include any of the above systems or devices.

Storage controller 12 may be described in the general context of computer system-executable instructions, such as program modules, being executed by a computer processor. Generally, program modules may include routines, programs, objects, components, logic, and data structures that perform particular tasks or implement particular abstract data types. Storage controller 12 comprises: central processing unit (CPU) 24; FC ports 26A and 26B; bus 28; memory 30; and wide area network adapters (not shown). CPU 24 loads machine instructions from memory 30 and performs machine operations in response to the instructions. Such machine operations include: incrementing or decrementing a value in register (not shown); transferring a value from memory 30 to a register or vice versa; branching to a different location in memory if a condition is true or false (also known as a conditional branch instruction); and adding or subtracting the values in two different registers and loading the result in another register.

A typical CPU can perform many different machine operations. A set of machine instructions is called a machine code program. The machine instructions are written in a machine code language which is referred to a low level language. A computer program written in a high level language needs to be compiled to a machine code program before it can be run. Alternatively a machine code program, such as a virtual machine or an interpreter, can interpret a high level language in terms of machine operations. High-speed FC ports 26A and 26B are connected to bus 28 for enabling communication between storage disks 22A to 22D and applications 18. Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. In an embodiment, application data is not stored in the controller memory 30 and controller executable code is not stored in the storage 22A to 22D. However, other embodiments could handle the distinction differently. Examples of volatile memory 32 are random access memory (RAM) 36 and cache memory 38. Generally volatile memory is used because it is faster and generally non-volatile memory is used because it will hold the data for longer. Storage system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive).

Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of the various disclosed embodiments. A set of program modules configured to carry out the functions of one or more embodiments comprises: controller module 36 and quality of service module 200. Further program modules that support one or more embodiments, but are not shown, include firmware, boot strap program, operating system, and support applications. Each of the operating system, support applications, other program modules, and program data or some combination thereof, may include an implementation of a networking environment.

Figure 2:
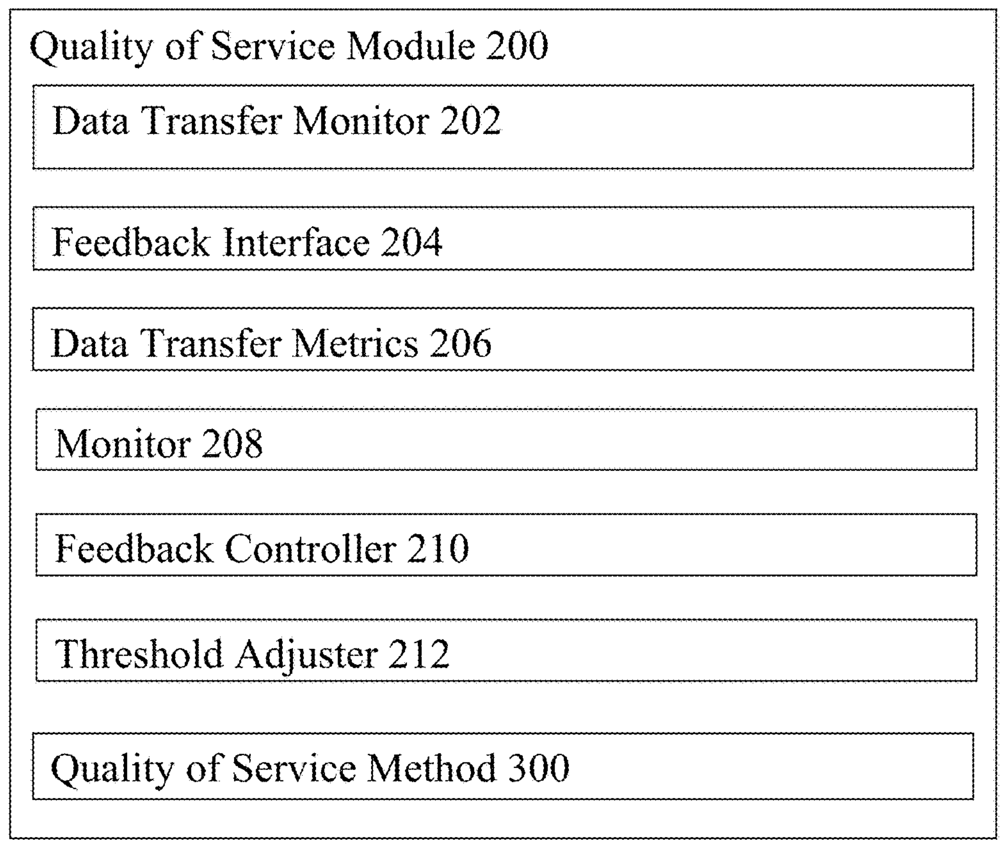
FIG. 2 is a component diagram of one embodiment.

Referring to FIG. 2, quality of service module 200 comprises the following components: data transfer monitor 202; feedback interface 204; data transfer metrics 206; monitor 208; feedback controller 210; threshold adjuster 212, and quality of service method 300. Data transfer monitor 202 is configured to monitor the application data that transfers between applications and controlled storage arrays. Feedback interface 204 is configured to receive and transmit control data between the applications and the quality of service module 200. Data transfer metrics 206 is a repository configured to store data transfer metrics. Monitor 208 is configured to monitor data transfer rates for transferring data between storage and one or more applications. Feedback collector 210 is configured to collect feedback on the suitability of the transfer data rate from one or more of said applications. Threshold adjuster 212 is configured to change data network control threshold levels for at least one application based on monitored data transfer rate and the collected feedback. Quality of service method 300 is configured to control the quality of service within the storage controller.

Figure 3:
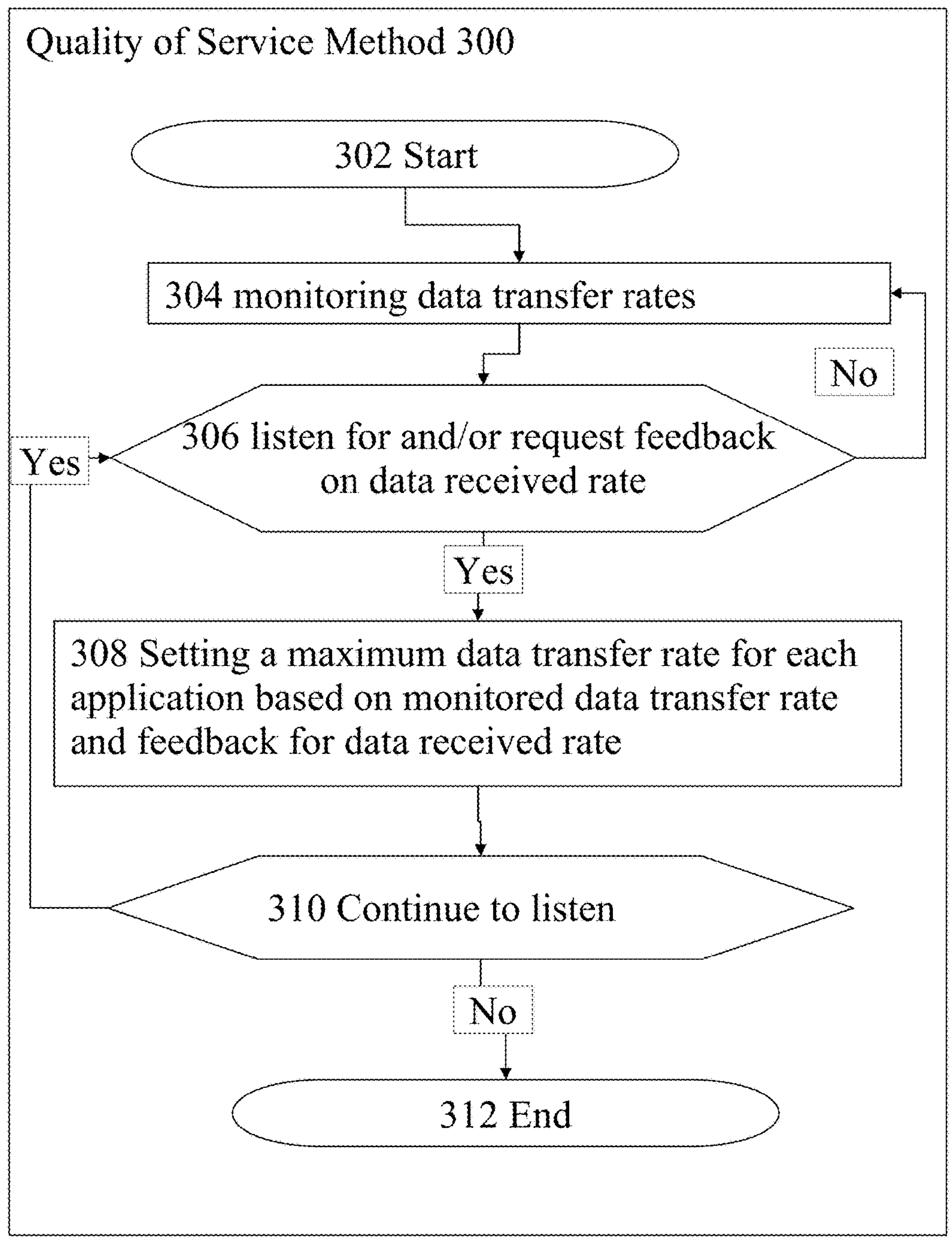
FIG. 3 is a flow diagram of a process of one embodiment.

Referring to FIG. 3, method 300 comprises logical blocks 302 to 312. The logical blocks 302-312 may, for example, correspond to a combination of software and hardware (i.e., code executed by a processor) or correspond strictly to hardware. Block 302 is the start of the method 300, in at least one embodiment the method 300 is a daemon initiated at startup and run in the background of the storage controller. In block 304 data transfer rates between applications and storage arrays are monitored. In block 306 listening for feedback on data received and data received rates of transfer is initiated. In block 306 requests for feedback may also be initiated. When feedback is received control transfers from block 306 to block 308. Otherwise, control loops back to block 304, where additional listening for feedback is initiated. In block 308, a maximum data transfer rate is set for an application based on a monitored data transfer rate and the feedback for data received rate. In block 310, a decision is made as to whether to continue to listen for feedback by returning to block 306 or discontinue listening by transferring control to block 312. In block 312, the quality of service method 300 is terminated.

Figures 4A, 4B:
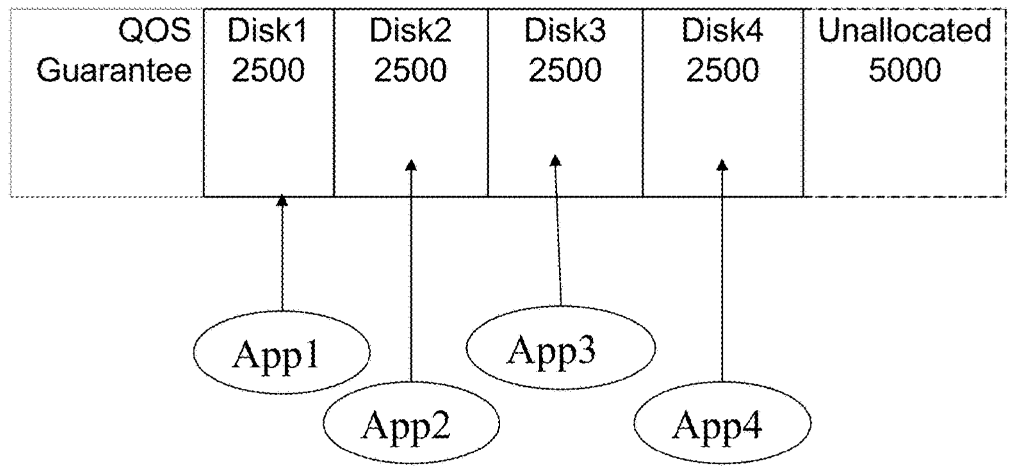
FIGS. 4A to 4D show an example set of applications requesting a minimum quality of service.

FIGS. 4A to 4D show a first example set of applications requesting a minimum quality of service and how the technology can protect a workload from future performance degradation as additional workload is moved onto a storage controller. FIG. 4A shows how performance can be degraded without the embodiments when using the conventional methods of setting QoS independently of real application performance at the storage controller level, and then how application of the embodiments can avoid this situation. Initially a storage controller (capable of a total of 15,000 inputs or outputs per second (IOPS)) is configured with four virtual disks available to applications (Disk1, Disk2, Disk3 and Disk4). Each of the virtual disks is assigned a QoS guarantee of 2,500 IOPS by the storage administrator, meaning that each of the virtual disks is guaranteed to be able to obtain at least 2,500 IOPS if needed, and more if spare capacity is available. Four host applications (App1, App2, App3 and App4) are shown, each utilizing a single virtual disk on the storage controller. Since spare capacity is available, disks are free to use as many IOPS as the application using the disk requires.

FIG. 4B shows the IOPS demanded and received (the actual QoS) by the four disks when all applications are running in a steady state. Disk1 utilizes fewer IOPS than allocated, and Disk3 and Disk4 are using more, utilizing some of the unallocated capacity and some of the spare IOPS donated back to the unallocated pool by Disk1. FIG. 4B also shows the state when a storage administrator introduces another two disks (or virtual disks) to the storage controller, which serve out 2500 IOPS as specified in the QoS guarantee. In this case, Disk3 and Disk4 suffer degraded performance, as the only spare IOPS they are able to use are the 500 IOPS allocated to Disk1 (that Disk1 is not using).

Figures 4C, 4D:
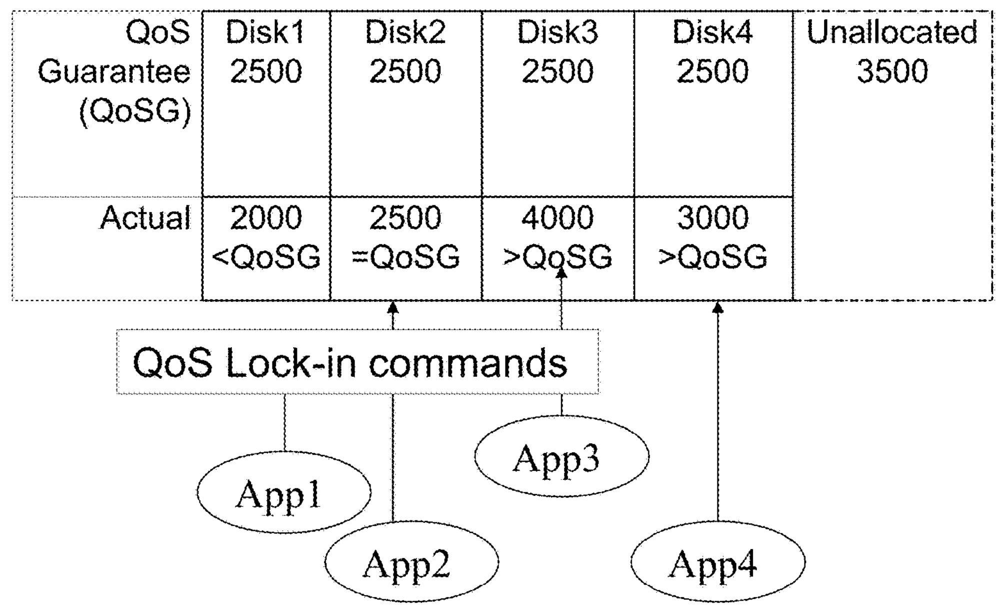

FIGS. 4C and 4D show the situation if the technology described in this disclosure were utilized to "Lock-in" current IOPS performance once the applications were running in a steady state. The QoS guarantees are updated and, once updated, the applications can run within the new QoS guarantees. As such, the pool of unallocated IOPS is an accurate representation of the "spare" IOPS available for use by other workloads, which enables a storage administrator to add workloads knowing that existing application performance will not be adversely affected.

Figures 5C, 5D:
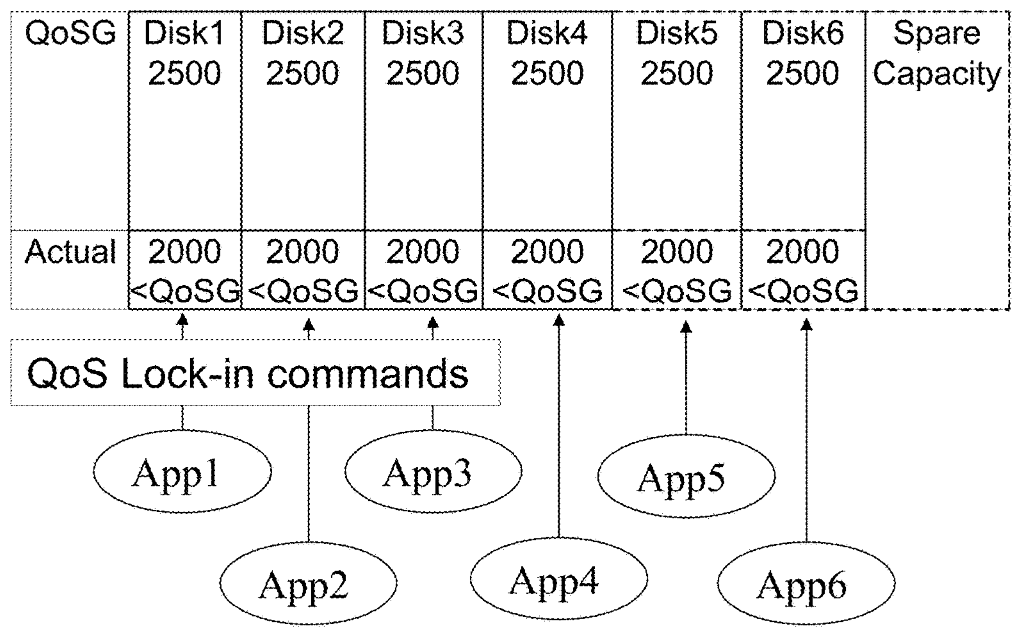

FIGS. 5A to 5D show a further example set of applications requesting a minimum quality of service. FIG. 5A shows six virtual disks (used by six applications) provisioned on a storage controller that has a total capacity of 15,000 IOPS. To ensure quality of service, a storage controller administrator has set a QoS guarantee of 2,500 IOPS for each disk, and thus for each application. The storage controller therefore appears to be at capacity. FIG. 5B shows that each of applications only issues 2,000 IOPS because the application does not receive the expected demand or because it is bottlenecked on network or CPU capacity. As a result, there is spare capacity which is not visible to a storage controller administrator.

FIG. 5C shows applications sending QoS lock-in commands that would reduce the storage controller's QoS guarantees to reflect the actual demand of the application. FIG. 5D shows, that as a result of these commands, the QoS guarantees for the applications are reduced, and the unallocated capacity is available for the storage controller administrator to allocate for new workloads, confident that these new workloads will not impact the performance of existing workloads.

Accordingly, techniques have been disclosed herein that advantageously manage storage controller quality of service.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of managing a data network comprising:

monitoring, using a processor, a data transfer rate and a data transfer threshold for data transferred between storage and an application that is executing on a data processing system, wherein an initial value of the data transfer threshold is set without consideration of a current actual demand of the application and the data transfer threshold corresponds to a quality of service guarantee, wherein the data transfer threshold corresponds to a data transfer threshold in a network switch;

collecting, using the processor, feedback on the suitability of the data transfer rate from the application; and changing, using the processor, the data transfer threshold for the application based on the monitored data transfer rate and the collected feedback to achieve a quality of service requirement for the application that reflects the current actual demand of the application, wherein the data transfer threshold is lowered in response to the current actual demand of the application being lower than the initial value and is increased when spare capacity is available in response to the current actual demand of the application being higher than the initial value, and wherein the feedback includes an application programming interface (API) message for indicating that a required performance level has been reached.

2. The method of claim 1, further comprising:

setting a minimum data transfer rate as the monitored data transfer rate for the application, in response to the application indicating that a required performance level has been reached.

3. The method of claim 1, further comprising:

requesting the feedback from the application.

* * * * *